United States Patent [19]

Kishita et al.

[11] Patent Number: 5,386,049
[45] Date of Patent: Jan. 31, 1995

[54] ORGANIC SILICON COMPOUNDS

[75] Inventors: Hirofumi Kishita; Shinichi Sato, both of Annaka; Kouichi Yamaguchi, Takasaki; Noriyuki Koike, Gunma; Takashi Matsuda, Annaka, all of Japan

[73] Assignee: Shin-Etsu Chemical Co., Ltd., Tokyo, Japan

[21] Appl. No.: 18,510

[22] Filed: Feb. 17, 1993

[30] Foreign Application Priority Data

Feb. 17, 1992 [JP] Japan .................. 4-061165

[51] Int. Cl.$^6$ .............................. C07F 7/08
[52] U.S. Cl. .................. 556/434; 556/435
[58] Field of Search ............... 556/434, 435

[56] References Cited

U.S. PATENT DOCUMENTS

| | | | |
|---|---|---|---|
| 2,452,895 | 11/1948 | Bluestein | 556/434 |
| 2,491,833 | 12/1949 | Sauer | 556/435 |
| 2,562,000 | 7/1951 | Sveda | 556/434 X |
| 3,179,678 | 4/1965 | Daughenbaugh | 556/435 |
| 3,328,448 | 6/1967 | Barnes et al. | 556/435 |
| 5,117,025 | 5/1992 | Takago et al. | 556/434 |

FOREIGN PATENT DOCUMENTS

| | | |
|---|---|---|
| 414938 | 3/1991 | European Pat. Off. |
| 465262 | 1/1992 | European Pat. Off. |
| 1483375 | 6/1966 | France |

OTHER PUBLICATIONS

Sommer et al., J. of the Amer. Chem. Soc., vol. 77, No. 9, May 12, 1955, pp. 2482-2485.
Chemical Patents Index Basic Abstracts Journal, Abstract of JP 61 220 703, Jan. 14, 1987.

*Primary Examiner*—Paul F. Shaver
*Attorney, Agent, or Firm*—Millen, White, Zelano & Branigan

[57] ABSTRACT

Organic silicone compounds of this invention are expressed by the following general chemical formula:

$$XO \!\!-\!\! \left( \underset{\underset{CH_3}{|}}{\overset{\overset{R^1}{|}}{Si}} \!\!-\!\! (CH_2)_p \!\!-\!\! \underset{\underset{CH_3}{|}}{\overset{\overset{R^1}{|}}{Si}} O \right)_{\!\!n} \!\!\!-\!\! \left( \underset{\underset{CH_3}{|}}{\overset{\overset{R^2}{|}}{Si}} O \right)_{\!\!m} \!\!\!-\!\! X$$

wherein $R^1$ is a substituted or unsubstituted alkyl group with 1 to 4 carbon atoms, $R^2$ is substituted or unsubstituted monovalent hydrocarbon group, X is either a hydrogen atom or a triorganosilyl group which is expressed by the following general chemical formula (2):

$$-\underset{\underset{R^4}{|}}{\overset{\overset{R^3}{|}}{Si}}-R^5$$

wherein $R^3$, $R^4$ and $R^5$ are a substituted or unsubstituted monovalent hydrocarbon group with 1 to 8 carbon atoms, each of which may be the same or different, p is an integer from 4 to 16, m is an integer from 0 to 1000, and n is an integer from 1 to 1000. The organic silicon compounds of this invention are extremely useful as raw material of rubber cured products with high strength and a superior transparency.

9 Claims, 5 Drawing Sheets

ORGANIC SILICON COMPOUNDS

BACKGROUND OF THE INVENTION

This invention relates to novel organic silicon compounds.

Organopolysiloxanes which possess hydroxyl groups bonded to silicon atoms at both ends of the molecular chain have already been known. When these organopolysiloxanes are combined with, for example, the silane compounds which comprise readily hydrolyzable groups, they will be cured by moisture in the air and form rubber elastic bodies, the cured products. Therefore, these compositions are widely utilized as adhesives, construction use sealing agents, and like uses.

However, the recent rapid progress of technology in various fields demands the further improvement of the said rubber materials with respect to their strength and transparency.

SUMMARY OF THE INVENTION

This invention offers novel organic silicon compounds which are expressed by the following general chemical formula (1):

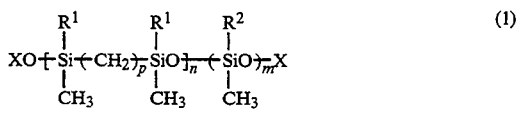

wherein $R^1$ is a substituted or unsubstituted alkyl group with 1 to 4 carbon atoms, $R^2$ is a substituted or unsubstituted monovalent hydrocarbon group, X is either a hydrogen atom or a triorganosityl group which is expressed by the following general chemical formula (2):

wherein $R^3$, $R^4$ and $R^5$, being the same or different, are a substituted or unsubstituted monovalent hydrocarbon group with 1 to 8 carbon atoms, p is an integer from 4 to 16, m is 0 or an integer from 1 to 1000, n is an integer from 1 to 1000.

Organic silicon compounds of this invention are extremely useful as raw material of rubber cured products with a high strength and a superior transparency.

DETAILED DESCRIPTION OF THE INVENTION

Organic silicon compounds of this invention comprise silicon atoms which are bonded through an alkylene group with 4 to 16 carbon atoms within the molecular chain. This is a clear difference from the organopolysiloxanes which have already been known. Such a molecular structure enables these organic silicon compounds to form rubber materials with a high strength and a superior transparency.

In the above general formula (1), $R^1$ is either a substituted or unsubstituted alkyl group such as, for example, a methyl group, ethyl group, propyl group, butyl group, and these groups in which a part of, or all of, the hydrogen atoms are substituted with halogen atoms, for example, fluoro atoms.

Further, $R^2$ is either a substituted or unsubstituted monovalent hydrocarbon group, which preferably possesses 1 to 8 carbon atoms. Examples of such are: alkyl groups such as a methyl group, ethyl group, propyl group, and a butyl group; cycloalkyl groups such as a cyclokexyl group; alkenyl groups such as a vinyl group, an allyl group and an isopropenyl group; aryl or aralkyl groups, for example, carbocyclic aryl groups, such as a phenyl group, a tolyl group, and a phenylethyl group; and the above groups in which a part of, or all of, the hydrogen atoms are substituted with halogen atoms such as, for example, a 3,3,3-trifluoropropyl group, a 6,6,6,5,5,4,4,3,3-nonafluorohexyl group, a chloromethyl group, and a 3-chloropropyl group.

X is either a hydrogen atom or a triorganosilyl group expressed by the general chemical formula (2). Here $R^3$, $R^4$ and $R^5$ are the similar groups as defined for $R^2$.

Below representative examples for the organic silicon compounds of this invention are shown.

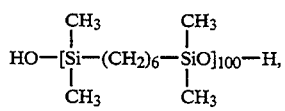

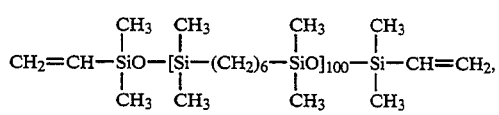

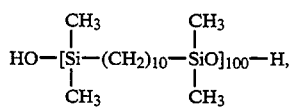

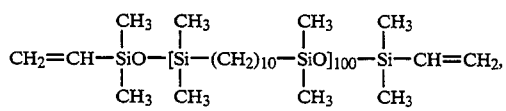

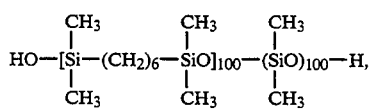

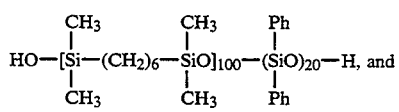

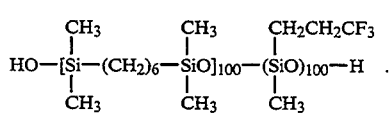

Combination of the organic silicon compounds of this invention with crosslinking agents, such as silane compounds which comprise readily hydrolyzable groups, will lead to the rubber compositions which form cured products with a high strength, a high transparency, and a low humidity permeability. Therefore, these organic silicon compounds are applicable to various types of usages, and are particularly suitable as packing materials and as adhesives for glass. Since these organic silicon compounds are of a liquid type, they are also useful as a raw material for preparing liquid gaskets of FIPG machines.

The organic silicon compounds of this invention can be manufactured by the method described below.

Compounds which possess ethylene-type double bonds at both ends of its molecular chain, expressed by the general chemical formula below:

$$CH_2=CH-(CH_2)_k-CH=CH_2 \quad (3),$$

wherein k is 0 or an integer from 1 to 12, are utilized as a starting material. This compound is reacted (by an addition reaction) with methyl chlorosilane in the presence of a platinum group catalyst, which results in a dichlorosilane of the following general chemical formula (4):

$$Cl-\underset{\underset{CH_3}{|}}{\overset{\overset{R^1}{|}}{Si}}-(CH_2)_{k+4}-\underset{\underset{CH_3}{|}}{\overset{\overset{R^1}{|}}{Si}}-Cl, \quad (4)$$

wherein $R^1$ and k are the same as described previously. This dichlorosilane is hydrolyzed to possess silanols at both ends, then it is further reacted (by a condensation reaction) in the presence of a condensation catalyst, in order to prepare the organic silicon compounds of this invention expressed by the general chemical formula (1). The condensation catalysts which can be adequately utilized in this invention are, for example, perfluorocarboxylic acid, tetramethyl guanidine, and trifluoroacetates. Their usage amounts are desirably in the range of 0.1 to 0.5 wt. % based on the weight of the silanol compound. Further, the condensation reaction is desirably carried out in the temperature range of 60° to 150° C., more preferably, 80° to 120° C. The platinum group catalysts used in the addition reaction can be, for example: chloroplatinic acid and complexes thereof with olefins, e.g., ethylene; alcohols or vinylsiloxanes; or, solid catalysts, such as, composites of platinum black with silica, alumina or carbon. A liquid catalyst of chloroplatinic acid or complexes thereof in a solvent is preferred. The organic silicon compounds obtained are those with hydrogen atoms as the X groups in the general formula (1).

Organic silicon compounds with triorganosilyl groups, in which the X groups are expressed by the general formula (2), are obtained by carrying out the reaction between the organic silicon compounds obtained as above and silylating agents with triorganosilyl groups. Examples of such silylating agents are triorganosilyl ketene acetal, triorganosilazane, and triorganosilyl acetate. This silylating reaction is usually carried out in the temperature range of 20° to 100° C.

DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japanese No. 4-61165, filed Feb. 17, 1992, are hereby incorporated by reference.

EXAMPLES

Example 1

A 160 g amount of the compound with silanols at both its ends, of the following formula:

$$HO-\underset{\underset{CH_3}{|}}{\overset{\overset{CH_3}{|}}{Si}}-(CH_2)_6-\underset{\underset{CH_3}{|}}{\overset{\overset{CH_3}{|}}{SiO}}-H,$$

and a 0.25 g amount of a condensation catalyst:

$$C_3F_7OCFCF_2OCFCOOH$$
$$\phantom{C_3F_7O}\underset{CF_3}{|}\phantom{CF_2O}\underset{CF_3}{|}$$

were placed in a 300 ml capacity four-neck flask equipped with a stirrer, a thermometer, and a reflux condenser and the mixture was stirred for three hours at 120° C. As the reaction proceeded, the viscosity of the mixture increased and formed water by condensation.

After the reaction, the condensation water was removed by distillation under reduced pressure and a viscous liquid with the following properties was obtained: index of refraction (25° C.), 1.451; specific weight (25° C.), 0.8976; and viscosity (25° C.), 320 cP.

This viscous liquid was identified by NMR, IR and elemental analysis and the analytical results are shown as follows:

$^1$H-NMR: δ (ppm) 0.09 (s, Si—CH$_3$), 0.56 (t, Si—CH$_2$), and 1.09 (s, C—CH$_2$—C).

Figure 1:
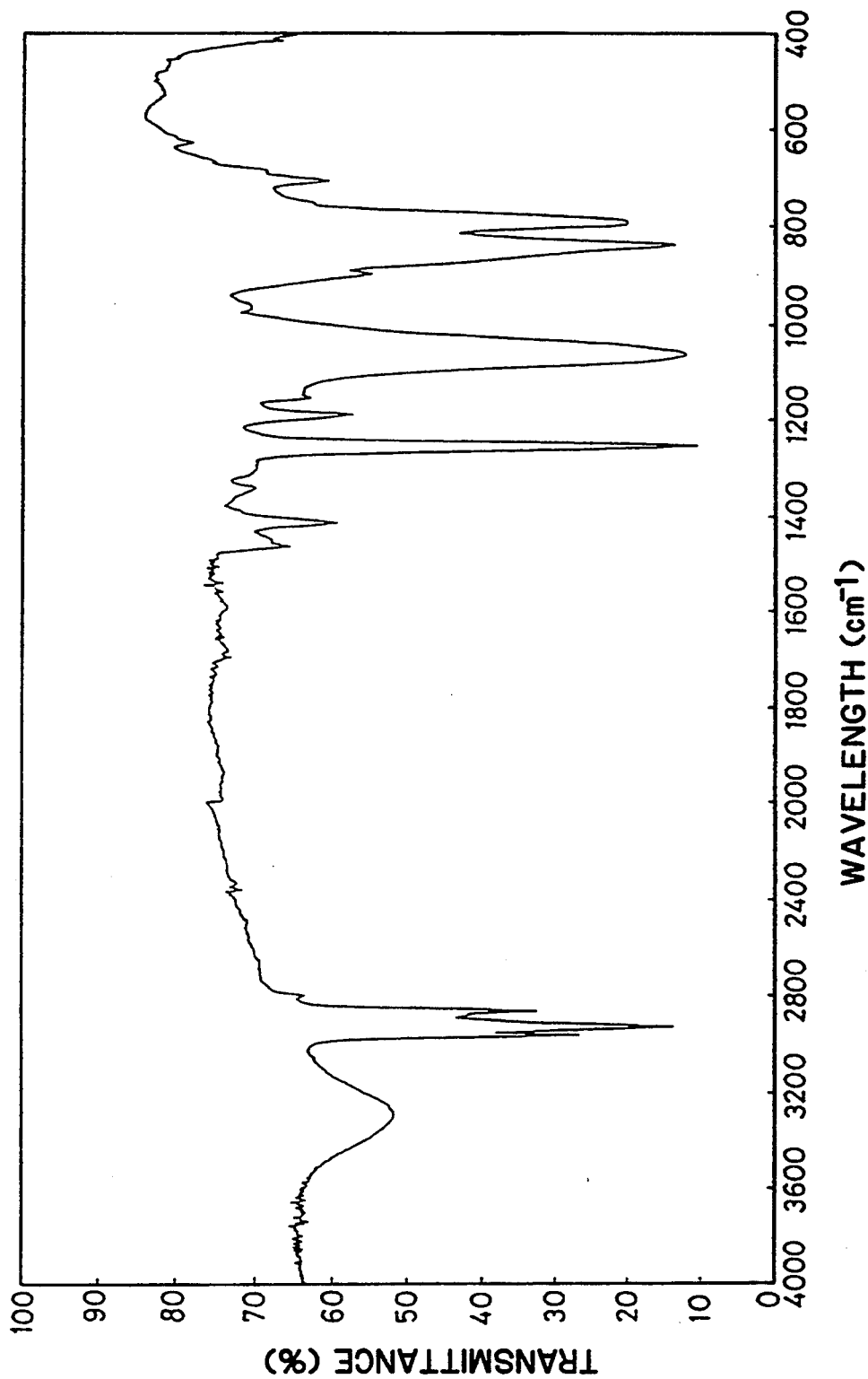
FIG. 1 is an IR charge for the organic silicon compound of this invention which was synthesized in Example 1. The ordinate and abscissa indicate transmittance (%) and wave number (cm$^{-1}$), respectively.

IR: Actual chart is shown in FIG. 1. Si—O—Si: 1060 cm$^{-1}$.

| Elemental Analysis | | | | |
|---|---|---|---|---|
| | C % | H % | Si % | O % |
| Calculated Values | 55.5 | 11.2 | 25.9 | 7.4 |
| Measured Values | 55.4 | 11.3 | 25.7 | 7.6 |

Based on the results above, the obtained viscous liquid was confirmed to be the organic silicon compound expressed by the following formula (5):

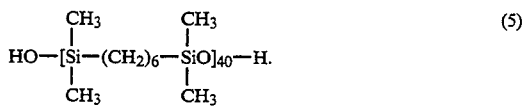

Example 2

A viscous liquid was obtained by the same procedure as described in Example 1, except that a 160 g amount of the compound of the formula below was employed as a starting material, that is the compound with silanols at both its ends:

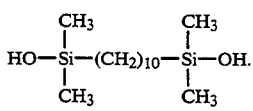

This viscous liquid possessed the following properties: index of refraction (25° C.), 1.456; specific weight (25° C.), 0.8923; and viscosity (25° C.), 12,300 cP.

This viscous liquid was identified by NMR, IR and elemental analysis and the analytical results are shown as follows:

$^1$H-NMR: δ (ppm) 0.06 (s, Si—CH$_3$), 0.53 (t, Si—CH$_2$), and 1.32 (s, C—CH$_2$—C).

Figure 2:
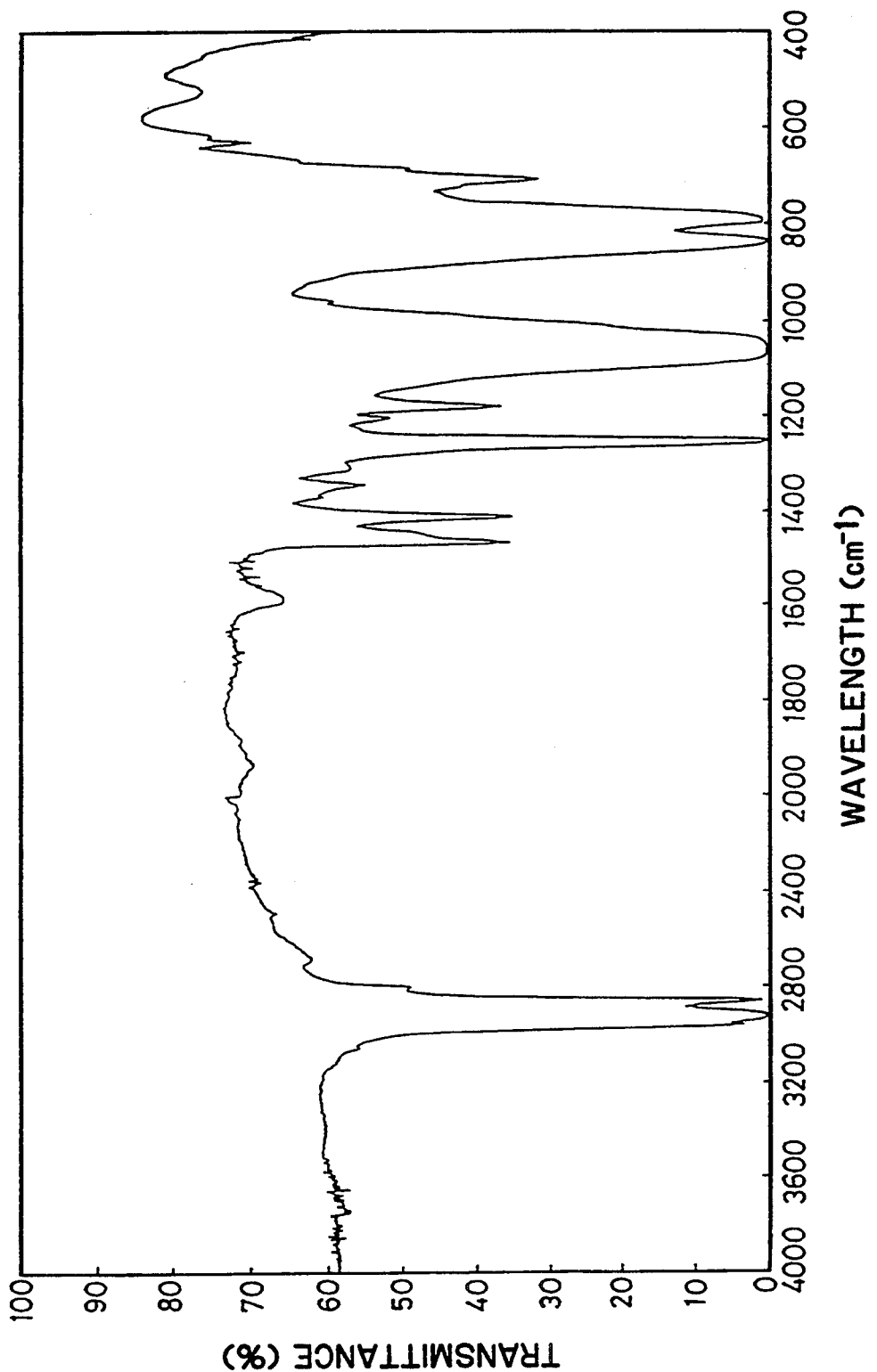
FIG. 2 is an IR charge for the organic silicon compound of this invention which was synthesized in Example 2. The ordinate and abscissa indicate transmittance (%) and wave number (cm$^{-1}$), respectively.

IR: Actual chart is shown in FIG. 2. Si—O—Si: 1060 cm$^{-1}$

| Elemental Analysis | | | | |
|---|---|---|---|---|
| | C % | H % | Si % | O % |
| Calculated Values | 61.7 | 8.9 | 20.6 | 5.9 |
| Measured Values | 61.6 | 8.7 | 20.5 | 6.0 |

Based on the results above, the obtained viscous liquid was confirmed to be the organic silicon compound expressed by the following formula (6):

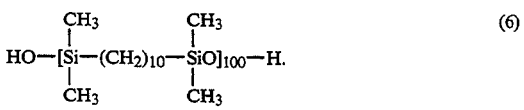

Example 3

A 200 g amount of the compound with silanols at both its ends which was utilized in Example 1 as a raw material, a 200 g amount of the compound with silanols at both its ends, expressed by the following formula:

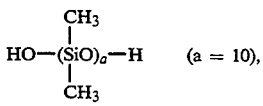

and a 0.5 g amount of a condensation catalyst:

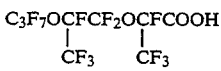

were placed in a 1 l capacity four-neck flask equipped with a stirrer, a thermometer, and a reflux condenser and the mixture was stirred for three hours at 120° C. As the reaction proceeded, the viscosity of the mixture increased and formed the condensation water.

After the reaction, the condensation water was removed by distillation under reduced pressure and a viscous liquid with the following properties was obtained: index of refraction (25° C.), 1.4325; specific weight (25° C.), 0.928; and viscosity (25° C.), 6,500 cP.

This viscous liquid was identified by NMR, IR and elemental analysis and analytical results are shown as follows:

$^1$H - NMR: δ (ppm) 0.06 (s, Si—CH$_3$), 0.56 (t, Si—CH$_2$), and 1.35 (s, C—CH$_2$—C).

Figure 3:
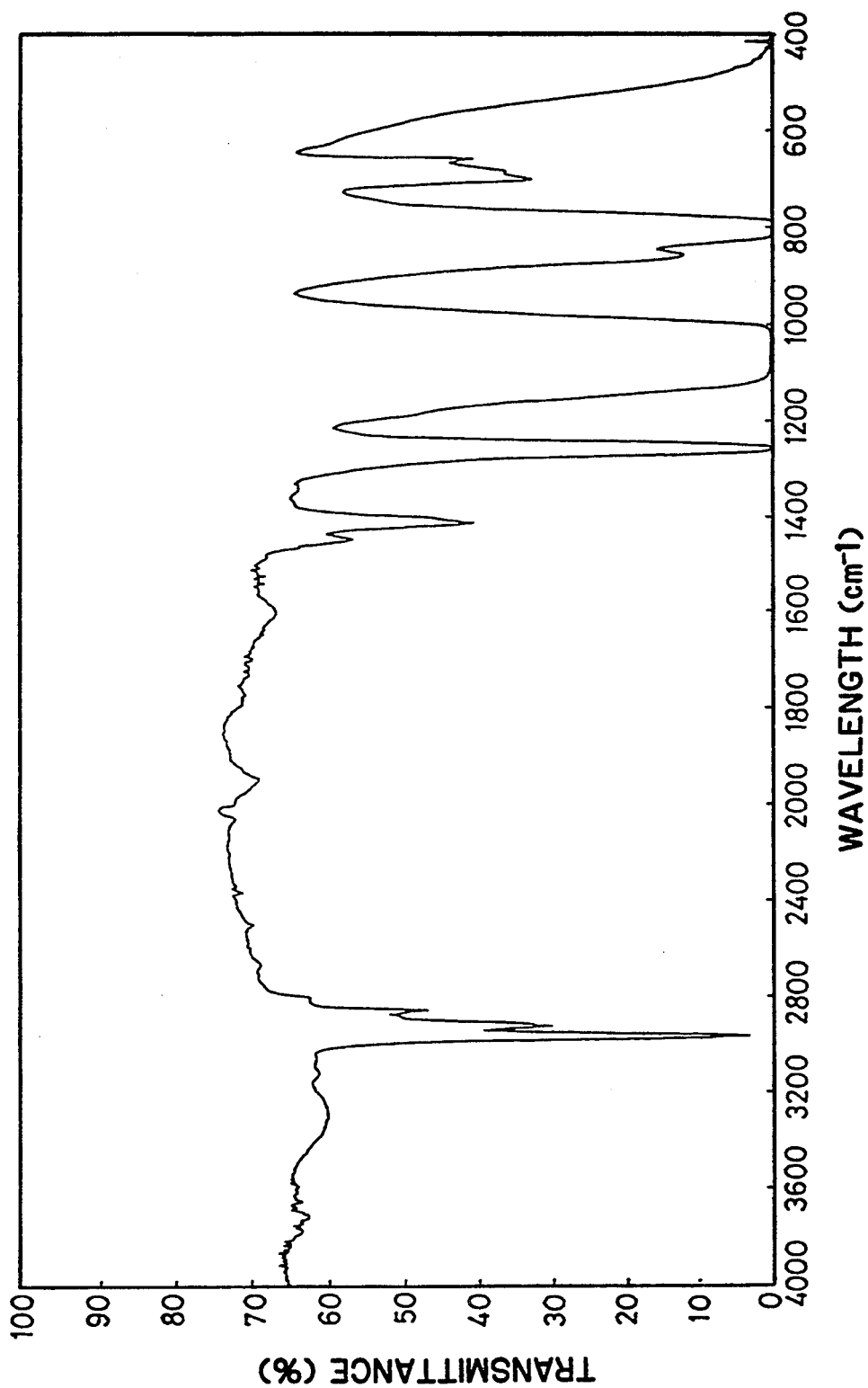
FIG. 3 is an IR charge for the organic silicon compound of this invention which was synthesized in Example 3. The ordinate and abscissa indicate transmittance (%) and wave number (cm$^{-1}$), respectively.

IR Actual chart is shown in FIG. 3. Si—O—Si: 1060 cm$^{-1}$.

| Elemental Analysis | | | | |
|---|---|---|---|---|
| | C % | H % | Si % | O % |
| Calculated Values | 44.0 | 9.7 | 31.8 | 14.5 |
| Measured Values | 44.1 | 9.6 | 31.8 | 14.4 |

Based on the results above, the obtained viscous liquid was confirmed to be the organic silicon compound expressed by the following formula (7):

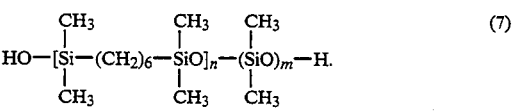

wherein n=47 and m=244.

Example 4

A 200 g amount of the organic silicon compound expressed by the formula (5), which was obtained in Example 1, and a 16.1 g amount of silyl ketene acetal, expressed by the following formula:

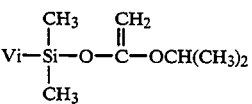

(wherein Vi designates a vinyl group) were placed in a 300 ml capacity four-neck flask equipped with a stirrer, a thermometer, and a reflux condenser and the mixture was stirred for three hours at 50° C.

After the reaction, the produced isopropyl acetate was removed by distillation and a viscous liquid with the following properties was obtained: index of refraction (25° C.), 1.451; specific weight (25° C.), 0.8972; and a viscosity (25° C.), 315 cP.

This viscous liquid was identified by NMR, IR, elemental analysis and quantitative analysis of Si-Vi (wherein Vi designates a vinyl group) and the analytical results are shown as follows:

$^1$H-NMR: δ (ppm) 0.08 (s, Si—CH$_3$), 0.56 (t, Si—CH$_2$), and 1.36 (s, C—CH$_2$—C).

Figure 4:
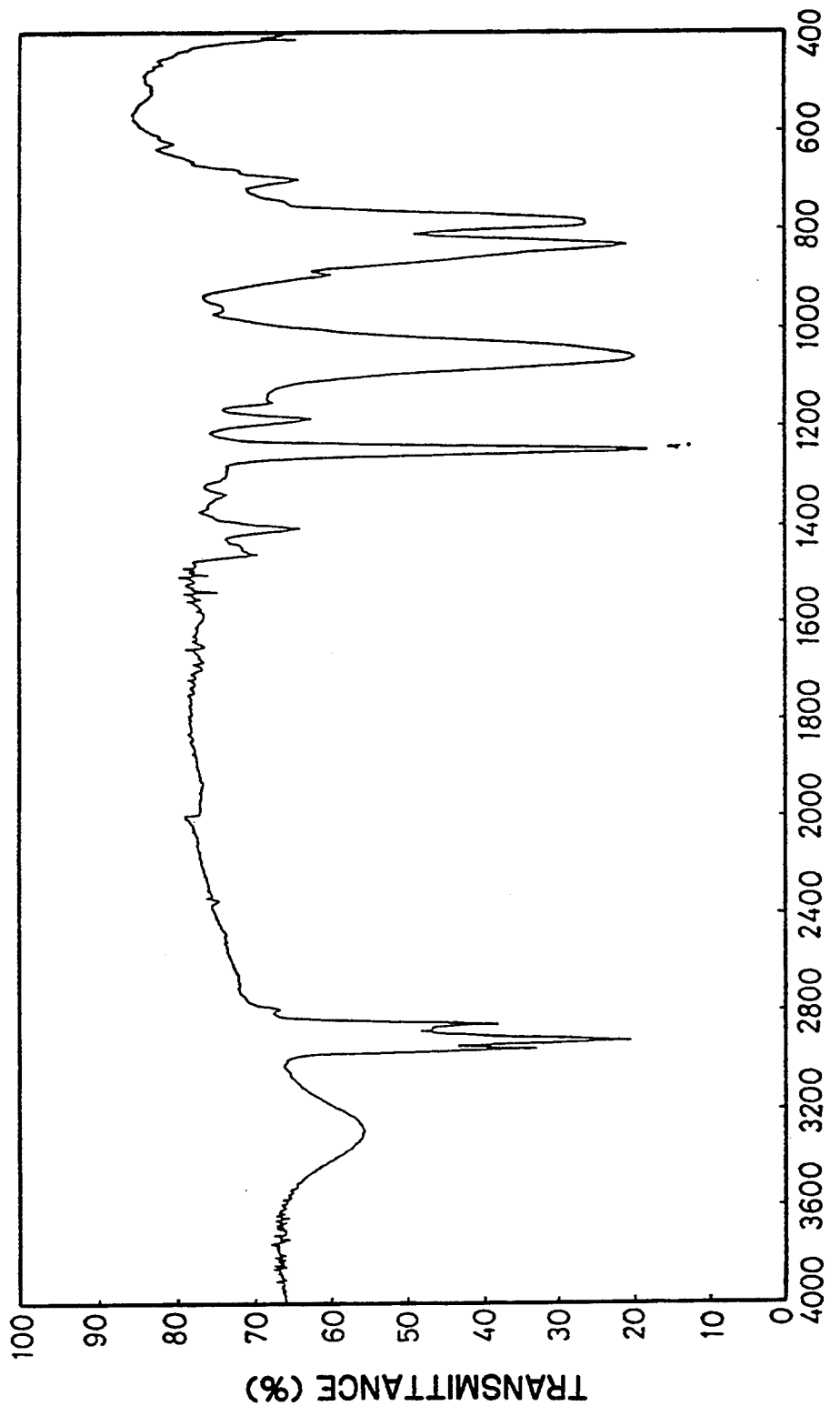
FIG. 4 is an IR charge for the organic silicon compound of this invention which was synthesized in Example 4. The ordinate and abscissa indicate transmittance (%) and wave number (cm$^{-1}$), respectively.

IR: Actual chart is shown in FIG. 4. Si—O—Si: 1060 cm$^{-1}$.

| | Elemental Analysis | | | |
|---|---|---|---|---|
| | C % | H % | Si % | O % |
| Calculated Values | 55.5 | 11.1 | 26.0 | 7.4 |
| Measured Values | 55.4 | 11.0 | 26.2 | 7.4 |

Quantitative Analysis, Si-Vi:

0.022 mol/100 g (calculated value: 0.0226 mol/100 g)

Based on the results above, the obtained viscous liquid was confirmed to be the organic silicon compound expressed by the following formula (8):

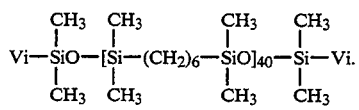  (8)

Example 5

A 200 g amount of the organic silicon compound expressed by the formula (6), which was obtained in Example 2, and a 5.1 g amount of silyl ketene acetal utilized in Example 4 were placed in a 300 ml capacity four-neck flask equipped with a stirrer, a thermometer, and a reflux condenser and the mixture was stirred for three hours at 50° C.

After the reaction, the produced isopropyl acetate was removed by distillation and a viscous liquid with the following properties was obtained: index of refraction (25° C.), 1.456; specific weight (25° C.), 0.892; and viscosity (25° C.), 11,300 cP.

This viscous liquid was identified by NMR, IR, elemental analysis and quantitative analysis of Si-Vi (wherein Vi designates a vinyl group) and the analytical results are shown as follows:

$^1$H-NMR: δ (ppm) 0.06 (s, Si—CH$_3$), 0.54 (t, Si—CH$_2$), and 1.33 (s, C—CH$_2$—C).

Figure 5:
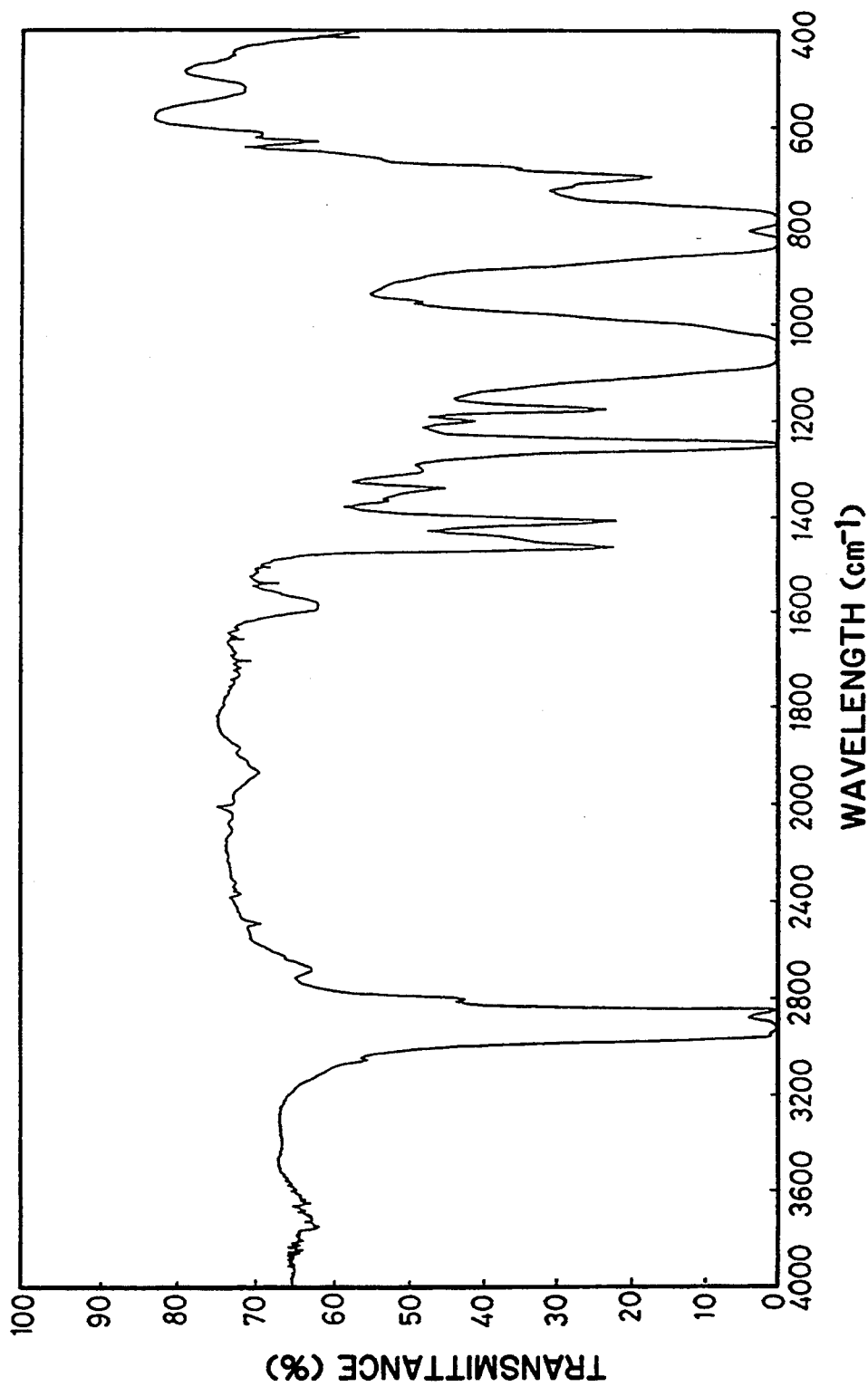
FIG. 5 is an IR charge for the organic silicon compound of this invention which was synthesized in Example 5. The ordinate and abscissa indicate transmittance (%) and wave number (cm$^{-1}$), respectively.

IR: Actual chart is shown in FIG. 5. Si—O—Si: 1060 cm$^{-1}$.

| | Elemental Analysis | | | |
|---|---|---|---|---|
| | C % | H % | Si % | O % |
| Calculated Values | 61.7 | 8.9 | 20.6 | 5.9 |
| Measured Values | 61.7 | 8.8 | 20.7 | 5.8 |

Quantitative Analysis, Si-Vi:

0.007 mol/100 g (Calculated value: 0.0073 mol/100 g)

Based on the results above, the obtained viscous liquid was confirmed to be the organic silicon compound expressed by the following formula (9):

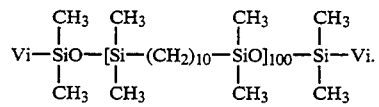  (9)

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Organic silicon compounds of the following formula (1):

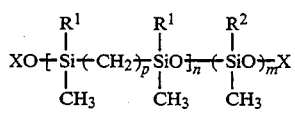  (1)

wherein R$^1$ is a substituted or unsubstituted alkyl group with 1 to 4 carbon atoms, R$^2$ is a substituted or unsubstituted monovalent hydrocarbon group, X is either a hydrogen atom or a triorganosilyl group of the following formula (2):

  (2)

wherein R$^3$, R$^4$ and R$^5$ are independently a substituted or unsubstituted monovalent hydrocarbon group with 1 to 8 carbon atoms, p is an integer from 6 to 16, m is 0 or an integer from 1 to 1000, and n is an integer from 1 to 1000, with the proviso that, when m is 0, and X is a hydrogen atom, p is an integer 10–16.

2. The organic silicon compounds of claim 1, wherein R$^1$ is a halogen-substituted alkyl group.

3. The organic silicon compounds of claim 1, wherein R$^1$ is methyl.

4. The organic silicon compounds of claim 1, wherein R$^2$ is an alkyl, cycloalkyl, alkenyl, phenyl, tolyl or phenylethyl group unsubstituted or substituted with halogen atom(s).

5. The organic silicon compound of claim 1, wherein R$^2$ is a 3,3,3-trifluoropropyl, 6,6,6,5,5,4,4,3,3-nonafluorohexyl, chloromethyl or 3-chloropropyl group.

6. The organic silicon compound of claim 1, wherein X is hydrogen and m is an integer of 1 to 1000.

7. The organic silicon compound of claim 1, wherein X is a triorganosilyl group.

8. The organic silicon compound of claim 1, wherein n is 40 to 100.

9. The organic silicon compound of claim 1, wherein R$^3$, R$^4$ and R$^5$ are independently selected from alkyl, cycloalkyl, alkenyl, phenyl, tolyl or phenethyl groups unsubstituted or substituted with halogen atom(s).

* * * * *